United States Patent [19]

Buzzelli et al.

[11] Patent Number: 4,474,862
[45] Date of Patent: Oct. 2, 1984

[54] HEAT RECHARGEABLE IRON BATTERY SYSTEM

[75] Inventors: Edward S. Buzzelli, Murrysville; Jack T. Brown, Churchill Borough, both of Pa.

[73] Assignee: Westinghouse Electric Corp., Pittsburgh, Pa.

[21] Appl. No.: 550,658

[22] Filed: Nov. 10, 1983

[51] Int. Cl.$^3$ .................. H01M 8/04; H01M 8/18
[52] U.S. Cl. .................................... 429/17; 429/20; 429/21; 429/49; 429/52
[58] Field of Search .................. 429/13, 17, 19, 20, 429/52, 221, 49, 21; 320/4

[56] References Cited

U.S. PATENT DOCUMENTS

| | | | |
|---|---|---|---|
| 2,638,182 | 7/1954 | Salauze | 429/221 |
| 3,457,488 | 7/1969 | Chodosh | 429/17 |
| 3,479,226 | 11/1969 | Oswin | 429/17 |
| 3,849,198 | 11/1974 | Siedel | 429/221 |
| 4,132,547 | 1/1979 | Buzzelli et al. | 429/221 |
| 4,152,489 | 5/1979 | Chottiner | 429/27 |
| 4,356,101 | 10/1982 | Jackovitz et al. | 429/221 |

Primary Examiner—Donald L. Walton
Assistant Examiner—Gerard P. Rooney, Jr.
Attorney, Agent, or Firm—D. P. Cillo

[57] ABSTRACT

The iron electrodes of a battery are recharged by removing them from the battery, heating them in a reducing gas atmosphere at over about 450° C., for a sufficient time to convert discharged iron compounds to charged iron compounds, and then cooling the charged electrodes.

9 Claims, 2 Drawing Figures

HEAT RECHARGEABLE IRON BATTERY SYSTEM

BACKGROUND OF THE INVENTION

Iron-air batteries are well known in the art, and taught, for example, by Chottiner, in U.S. Pat. No. 4,152,489. These batteries can utilize air as an oxidant reactant. The air contacts an electrode made of an outer hydrophobic membrane, laminated to an active hydrophilic layer. The electrode hydrophilic layers can contain carbon particles, catalyst, low oxygen overvoltage material, Such as WC, and binder, pasted into a fiber metal plaque. These batteries usually contain an iron fuel electrode, immersed in potassium hydroxide electrolyte, and disposed between a set of air electrodes. The iron electrode can contain a mixture of iron oxides, for example $Fe_2O_3$ and $Fe_3O_4$, with reaction promoting compounds and dispersing agents, pasted into diffusion bonded, nickel-plated steel plaques, as taught by Seidel, in U.S. Pat. No. 3,849,198. The iron electrode can also be self supporting, and contain sintered metallic iron particles coated with a metal sulfate, such as $MgSO_4$, as taught by Buzzelli et al., in U.S. Pat. No. 4,132,547.

Iron-air batteries have been considered as a power source for electrically run automobiles. These type batteries have a very high energy-to-density ratio, and are thus more attractive than standard lead acid batteries presently used as an engine starting source in automobiles. One of the main problems associated with battery-driven vehicles, however, is that, unlike the gasoline or diesel-fueled automobile where the fuel tank can be refilled in minutes, battery recharging may take from 2 to 10 hours. For commuter applications, the electrically rechargeable battery may be acceptable, where the vehicle can be parked overnight near a recharging source. It is unacceptable, however, for long distance interstate travel. What is needed, to make such a battery-driven vehicle competitive, and commercially useful, is a battery power system that can be recharged in from about 15 to 30 minutes.

Oswin recognized this problem in U.S. Pat. No. 3,479,226. The Oswin cell, while containing removable, metal anodes, utilized in-situ recharging. There, the air electrode would be connected to an in-place hydrogen-depolarized, consumable anode, more electronegative than hydrogen in alkali electrolyte, for example, cadmium, copper, nickel, cobalt, lead, or bismuth, and then swept with hydrogan gas. If zinc or iron were to be used as the anode, a suitable voltage would have to be applied, essentially defeating the purpose of the invention, since an external generator would be needed. In this second instance the anode was not removed for recharging.

In Oswin, the results were anodic oxidation of hydrogen at the air electrode and cathodic reduction of metal oxide at the metal electrode. Here, a sintered or sheet metal anode fits inside a bi-cathode air electrode sheath with an electrolyte saturated separator therebetween. Recharging time was approximately 2 hours utilizing a cadmium anode and 2½ hours using a zinc anode, where a DC power source was required to apply an appropriate voltage. In such a method, using a series of cells in battery configuration, air vents to the air electrode would have to be closed, and remaining oxygen removed by a nitrogen flush before introducing hydrogen.

Chodosh, in U.S. Pat. No. 3,457,488, teaches a battery, and an electrode construction somewhat similar to that of Oswin. Chodosh completely removes the consumable anode, places it in an external electrolyte bath, and electrically recharges it against a suitable counter-electrode, such as a nickel sheet, using a DC power source. Suitable anode materials are selected from sintered lead, iron, cadmium, aluminum, magnesium, and preferably zinc. Such electrical recharge external to the battery, though it could be recharged rapidly, i.e., at gassing potential, would still probably take about 1 hour. What is needed is an even quicker method to get battery-powered cars recharged and back on the road.

SUMMARY OF THE INVENTION

The above needs have been met, generally, by mechanically recharging an iron electrode from a battery. More specifically, the above problems have been solved by mechanically recharging a removable, discharged iron electrode from an iron-air battery, by removing the electrode, washing the electrode, and then heating the electrode at over about 450° C., preferably for about 10 to 20 minutes, in an atmosphere selected from carbon monoxide, dissociated ammonia, reformed hydrocarbons, hydrogen, and their mixtures, with hydrogen being preferred. After a cool-down period, the fully charged iron electrode can be inserted into the battery, for use.

Thus, service stations could incorporate means for refueling iron electrodes, requiring only a moderately sized oven, and a hydrogen source. A sophisticated furnace would not be necessary, just an upgraded oven. In an ongoing operation, total recharge time including cool-down would vary from about 20 to 30 minutes. Tremendous expense could be saved by elimination of tank truck gasoline delivery, and reliance on domestic or foreign gasoline would be dramatically reduced. Also, this mechanical, heat recharging could be more efficient in terms of time, and potentially less expensive overall than complete electrochemical recharging. Additonally, this same iron-air battery system could optionally be electrically recharged over a 2 to 10 hour period at a service station or in the car owner's garage. Iron electrodes are unique in being capable of both types of recharging.

BRIEF DESCRIPTION OF THE DRAWINGS

For a better understanding of the invention, reference may be made to an embodiment exemplary of the invention, shown in the accompanying drawings, in which.

DESCRIPTION OF THE PREFERRED EMBODIMENTS

Figure 1:
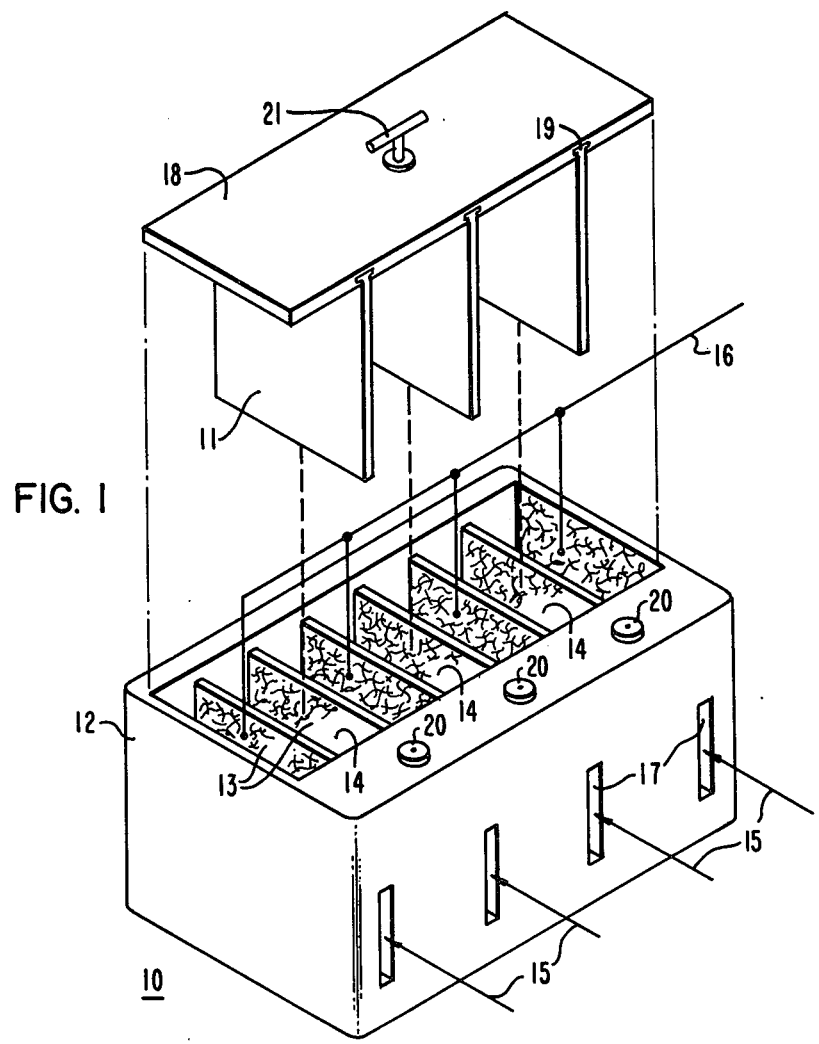
FIG. 1 shows an exploded perspective view of one possible type of iron-air battery, showing removable iron electrodes.

Referring now to FIG. 1 of the drawings, the battery 10 shown, is a general representation of one possible type of battery of this invention, including removable iron electrodes 11, disposed in electrolyte, between, preferably, two bifunctional air electrode cathodes, all contained in a casing. Generally, the battery 10 includes a casing 12 for support and containment of air electrodes 13, shown inside the casing, as well as alkali electrolyte, which is contained in sealed electrolyte wells 14 disposed between alternate sets of air electrodes, as shown. Preferably, the casing 12, comprising the sides and bottom of the battery, is fabricated from ABS plastic or other non-conducting material that is stable or resistant to the electrolyte. The electrolyte is usually an alkali hydroxide, such as KOH or NaOH with a possible optional addition of LiOH. Air or oxygen 15 can be fed to air electrode surfaces through contact in air wells 16 which communicate with air inlet means 17 by any conventional design. The term "air" as used throughout will be meant to include oxygen.

Thin iron electrodes 11, usually about 0.25 cm. (0.1 inch) thick, are preferably, removably attached to removable iron electrode support plate member 18, by any suitable means, such as a locked tongue and groove assembly, for example, T-shaped recesses through the support member, as shown. Bolts and screws could also be used but their removal would add to recharging time. The iron electrode top can have, for example, a high density coined T-shaped or other type top section 19 for insertion into a corresponding groove in the support plate member 18. Support plate member 18, with removably attached iron electrode 11, is lowered into the casing, as shown, with iron electrodes fitting into the electrolyte wells 14, between air electrodes and facing the hydrophilic air electrode layer. Electrolyte inlet and vent caps are shown as 20, and a handle to remove the support member is shown as 21. Air can exit the back of the casing. Electrical connections to positive and negative terminals are not shown, but would of course be included in the operational battery. The battery would be much more compact than shown, with from about 20 to 50 thin cells, rather than three. It is to be understood, that FIG. 1 is illustrative and not limiting, either as to the battery or the removable iron electrode design.

The air electrode cathodes 13, have a laminar structure, comprising a hydrophilic section and a hydrophobic section, with incorporated current collector. The active material hydrophilic section for this electrode can comprise particles of oxygen absorption/reduction carbonaceous material, such as carbon, graphite and the like; about 10 wt.% to about 50 wt.% binder, such as fluorinated ethylene propylene resin or polytetrafluoroethylene resin; a catalyst such as platinum, gold, silver and the like; and from about 0.25 part to about 5 parts/part carbonaceous material of a lower oxygen overvoltage material, such as $CuWO_4$, $NiWO_4$, $CoWO_4$, $WS_2$, WC, WC fuse coated with 1 wt.% to 20 wt.% Co, and their mixtures. The hydrophilic layer can comprise one or a plurality of plies. The hydrophilic layer is disposed next to the electrolyte.

The hydrophobic layer can comprise fluorinated ethylene propylene and/or polytetrafluoroethylene particles or fibers, mixed with high surface area carbons, and optionally mixed with polymethylmethacrylate plasticizer or the like. The hydrophobic layer is disposed next to the air supply. The porous current collector can be made of expanded nickel, coated or uncoated fiber metal, such as diffusion bonded steel wool or nickel coated diffusion bonded steel wool and the like. The hydrophilic layer, which generally contains the current collector, is usually roll laminated to the hydrophobic layer at about 190° C., at a pressure of from about 25 psi to about 500 psi. Complete details on the air electrode composition and fabrication can be found in U.S. Pat. No. 4,152,489, herein incorporated by reference.

The iron electrode anodes 11, which range in thickness from about 0.12 cm. to about 0.75 cm. (0.05 to 0.3 inch), can comprise iron powder, initially present as $FeO$, $Fe_2O_3$, $Fe_3O_4$, $FeO.Fe_2O_3$, $Fe_2O_3.H_2O$ and the like, with additions of sulfur containing additive and optional thickeners and dispersing agents. These oxides are reduced to Fe charged material by hydrogen reduction in the manufacturing process for iron electrodes. These materials can be slurried with water into a paste, which can be roll pasted into a porous supporting current collector, such as a mesh or grid of fibrous strands, such as nickel or nickel plated iron or steel of from about 75% to 96% porosity. The pasted electrodes are then heated in a reducing oven. One suitable grid structure is diffusion bonded nickel or steel fiber wool, where there is an interdiffusion of atoms across contacting fiber interfaces without fiber melting. Such iron powder and electrodes are described in detail in U.S. Pat. No. 3,849,198, herein incorporated by reference.

Another iron electrode anode can be made from a water slurry admixture of elemental iron particles and a soluble metal sulfate, such as $MgSO_4$ or $CdSO_4$. The slurry is dried, broken up and size graded, pressed to provide a green plaque structure, and then thermally reduced, activated and sintered at up to 1000° C. in a reducing atmosphere, preferably hydrogen gas, to provide a fused, self-supporting plaque, that can be used alone or bonded to a current collector for further support. Such electrodes are described in detail in U.S. Pat. No. 4,132,547, herein incorporated by reference. It is to be understood that the above iron electrode descriptions are illustrative and not limiting, and any electrode containing a form of iron as the main active material component can be recharged according to this invention.

In the iron-air battery vehicle propulsion system, the iron electrode provides the fuel for the system, i.e., it essentially determines the range of the vehicle. The iron-air system is unique in that the fuel electrode, the iron electrode, can be electrically recharged over a 2 hour to 10 hour period, or it can be mechanically recharged over a much shorter period by a special heating process. All of the other electrically rechargeable battery systems require electrical communication between the anode and cathode for recharge.

The inherent performance characteristics of the iron-air system are considered adequate and quite acceptable for electric vehicle propulsion. The system also has a projected low manufacturing cost. The combination of these performance characteristics and the dual mode of recharge make it the most desirable system for use in a general, all purpose vehicle. Electrochemically, the iron electrode in the fully charged state is essentially metallic iron. Upon discharge, the electrode is substantially converted to $Fe(OH)_2$, the reaction product, i.e., $Fe + 2(OH)^- \rightarrow Fe(OH)_2$.

The reaction product $Fe(OH)_2$ can be returned to Fe, by reduction of $Fe(OH)_2$ through heating the discharged iron electrode in a reducing gas at from about 450° C. to about 700° C., preferably from about 550° C. to about 700° C., for an effective time, preferably about 10 minutes to 20 minutes, producing an electrode which is fully charged. Temperatures over about 700° C. could cause sintering and loss of surface area. Temperatures under about 450° C. are not effective to provide good reduction to Fe. Useful reducing atmospheres include carbon monoxide, dissociated ammonia, reformed hydrocarbons, hydrogen gas, and their mixtures, with hydrogen gas preferred. The recharging takes place by the following reaction, with $H_2$ as an example:

$$Fe(OH)_2 + H_2 + heat \rightleftarrows Fe + 2H_2O$$

The water or steam can be easily disposed of. Any cooling means can be used to return the iron electrode to from about 25° C. to about 35° C. Since the electrodes are usually very thin, i.e., preferably about 0.1 inch thick, a fan can be used for quick cooling, no freezer or the like being required.

Figure 2:
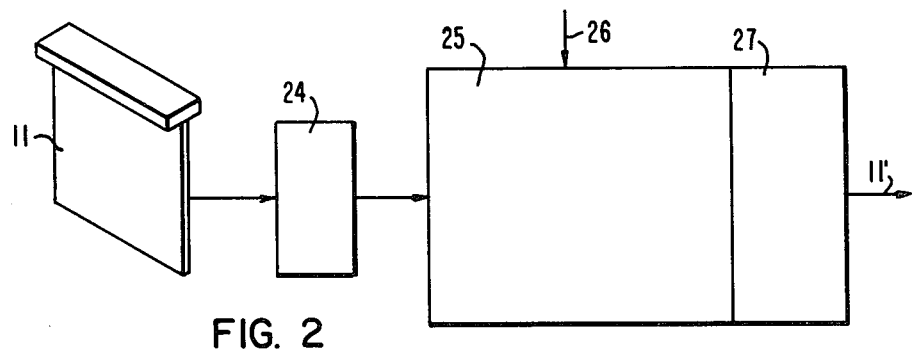
FIG. 2 is a schematic of the method of this invention, where an iron electrode is heated in an oven and then cooled, providing a recharged electrode.

As shown in FIG. 2, removable, thin iron electrode 11, containing discharged iron compounds substantially as $Fe(OH)_2$, is washed of electrolyte in washing means 24, and then placed in an oven 25, operating at from about 450° C. to about 700° C., having a reducing gas 26 fed thereinto, to reduce the $Fe(OH)_2$ essentially to Fe, elemental iron. Then, the hot, thin iron electrode is cooled, for example, by passing it through a cool zone 27 in the oven, in a nitrogen gas environment, to quickly cool the electrode to below about 35° C., in about 5 to 10 minutes. Such quick heating and cooling will not harm the electrode structure or active material. The oven may contain a nitrogen containing entry zone, a hydrogen containing hot zone, where the reaction takes place, and a cool zone containing nitrogen, where the thin electrodes cool rapidly. After exiting the cooling zone a fan can be used to further reduce the temperature of the thin electrode. The recharged electrode 11' is then ready for reinsertion into the battery.

In order to provide a general purpose vehicle with unlimited range, it is necessary to have a rapid recharge capability. Short of a complete battery exchange which is considered unacceptable, the iron-air battery system is the only electrochemical storage system which can be used in either a short charge or long charge mode.

EXAMPLE

A 40 sq. cm. iron electrode, having a thickness of about 0.1 inch, containing activated iron oxide powder pasted into a porous, diffusion bonded steel wool current collector plaque, was electrically discharged in an iron-air cell. The discharged electrode, containing iron compounds substantially as $Fe(OH)_2$, was removed from the cell, water washed to remove KOH electrolyte, and placed in a hydrogen fed moving belt furnace, having a hot zone operating at 650° C. Dwell time in the hot zone was about 10 minutes. The electrode was cooled in the oven cool zone for about 5 minutes, and then returned to the iron-air cell environment for electrical discharge. It operated well, indicating complete recharge and return to Fe material. Its performance was equivalent or slightly better than the previous discharge, the quick heating and cooling causing no adverse effects.

We claim:

1. A method of recharging an iron electrode from a battery, the battery comprising removable iron electrodes containing discharged iron compounds disposed in alkali electrolyte between electrode cathodes, all contained in a casing, comprising the steps of: (1) removing discharged iron electrodes from the battery; (2) heating the discharged iron electrodes in a reducing gas atmosphere at over about 450° C., for a time effective to convert discharged iron compounds to charged iron compounds in the electrodes; and (3) cooling the charged iron electrodes.

2. The method of claim 1, where the discharged iron electrode is heated at from about 450° C. to about 700° C. in hydrogen gas, and is washed of electrolyte before heating.

3. A method of quickly recharging an iron-air battery, the battery comprising removable iron electrodes containing discharged iron compounds disposed in alkali electrolyte between two air electrodes, all contained in a casing having air inlet means, comprising the steps of: (1) removing discharged iron electrodes from an iron-air battery; (2) heating the discharged iron electrodes in a reducing gas atmosphere at from about 450° C. to about 700° C., for up to about 20 minutes, to convert discharged iron compounds to charged iron compounds in the electrodes; (3) cooling the charged iron electrodes; and (4) replacing the charged iron electrodes in an iron-air battery.

4. The method of claim 3, where the discharged iron electrode is heated in a gas selected from the group consisting of hydrogen, carbon monoxide, dissociated ammonia, reformed hydrocarbons, and mixtures thereof, and is washed of electrolyte before heating.

5. The method of claim 3, where the discharged iron electrode is heated in hydrogen gas.

6. The method of claim 3, where the discharged iron electrode contains iron compounds substantially as $Fe(OH)_2$, and is heated at from about 500° C. to about 700° C.

7. The method of claim 3, where the charged iron electrode contains elemental iron, and is cooled in a nitrogen gas environment.

8. The method of claim 3, where the alkali electrolyte is an alkali hydroxide, the iron electrodes are removably attached to a removable support plate, the iron electrode comprises active material disposed within a porous fiber metal current collector, and the air electrode comprises an active material hydrophilic layer containing a current collector disposed next to electrolyte and bonded to a hydrophobic layer.

9. An iron-air battery recharged by the method of claim 3, which is also capable of electrical recharging.

* * * * *